UNITED STATES PATENT OFFICE.

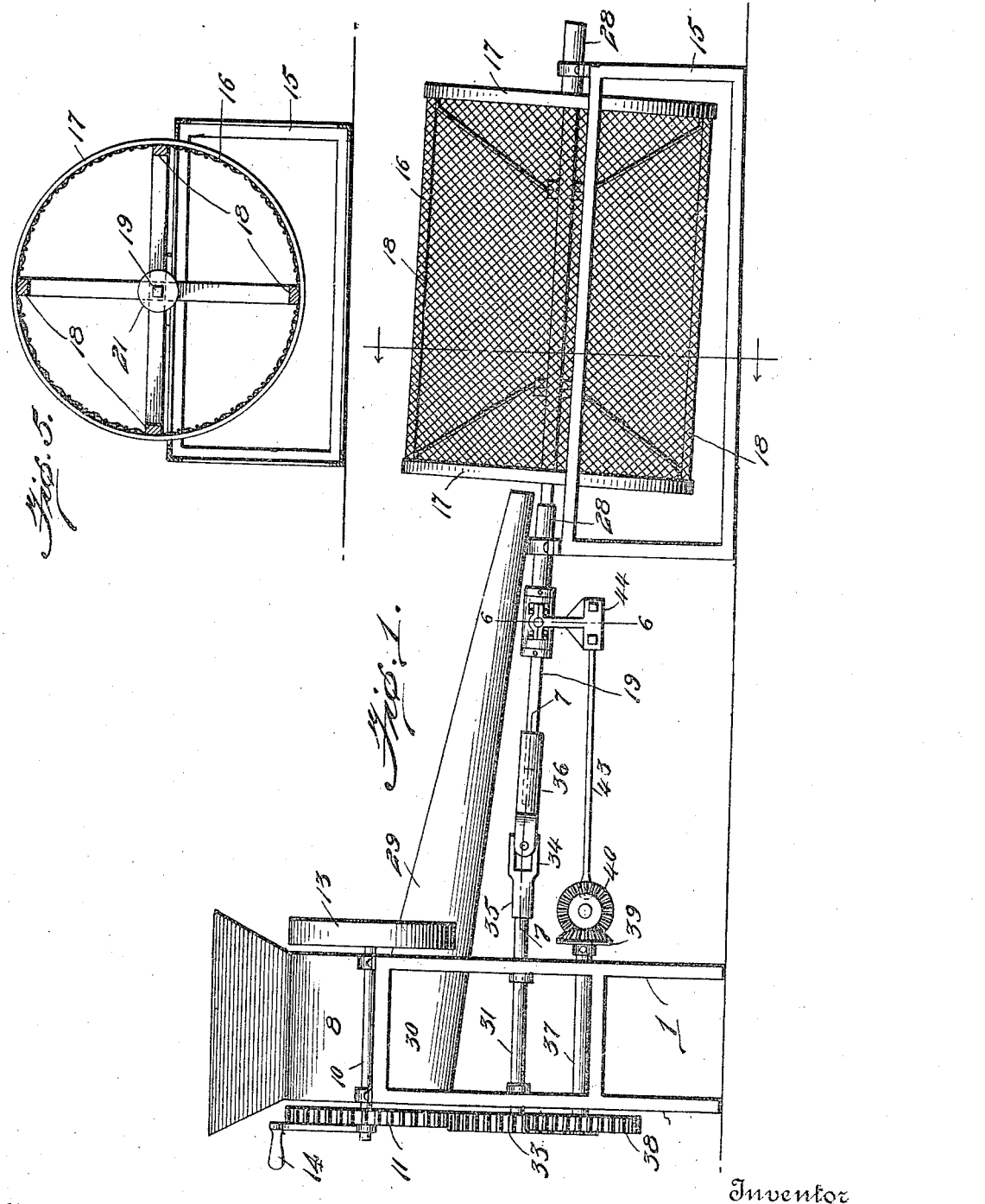

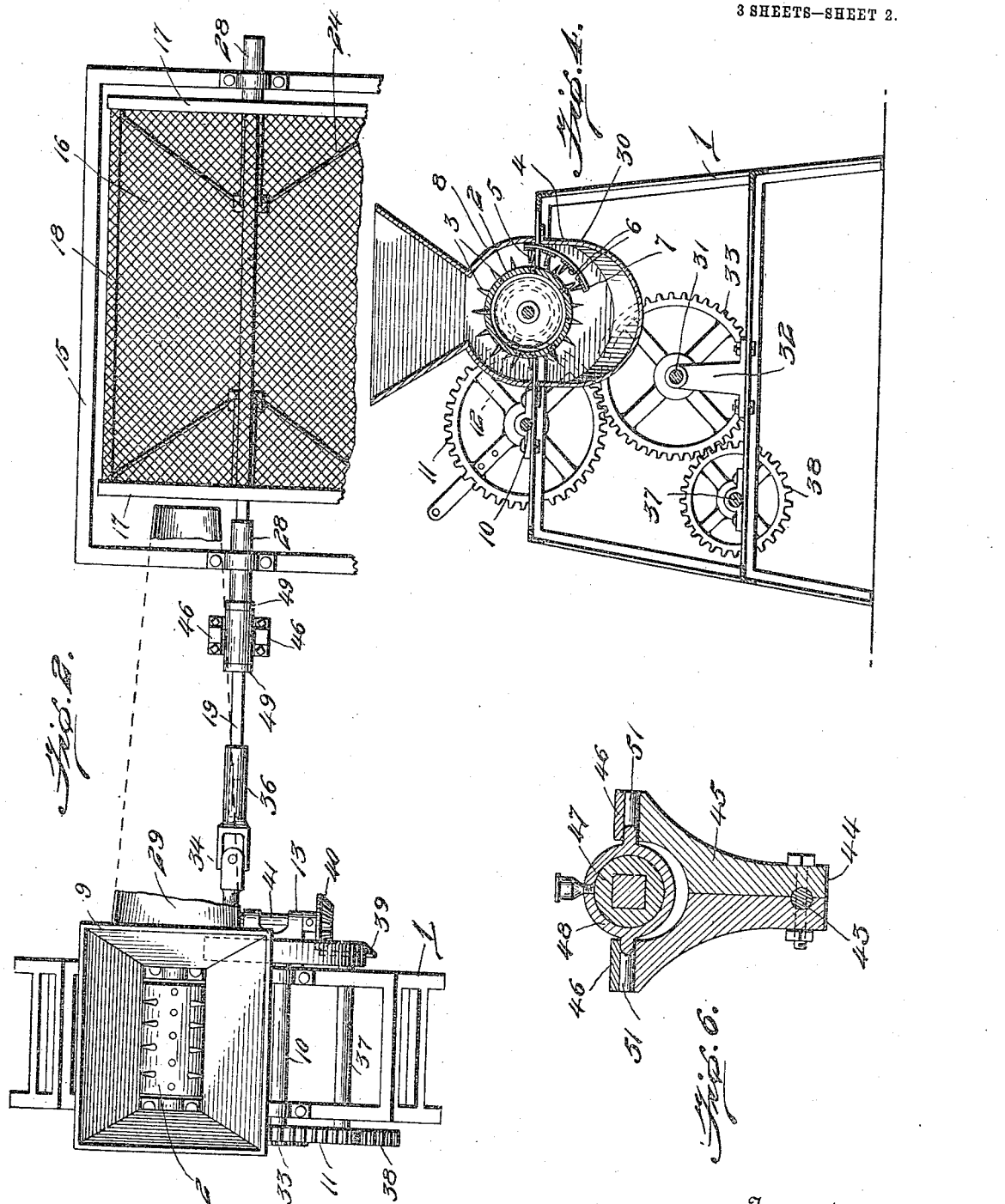

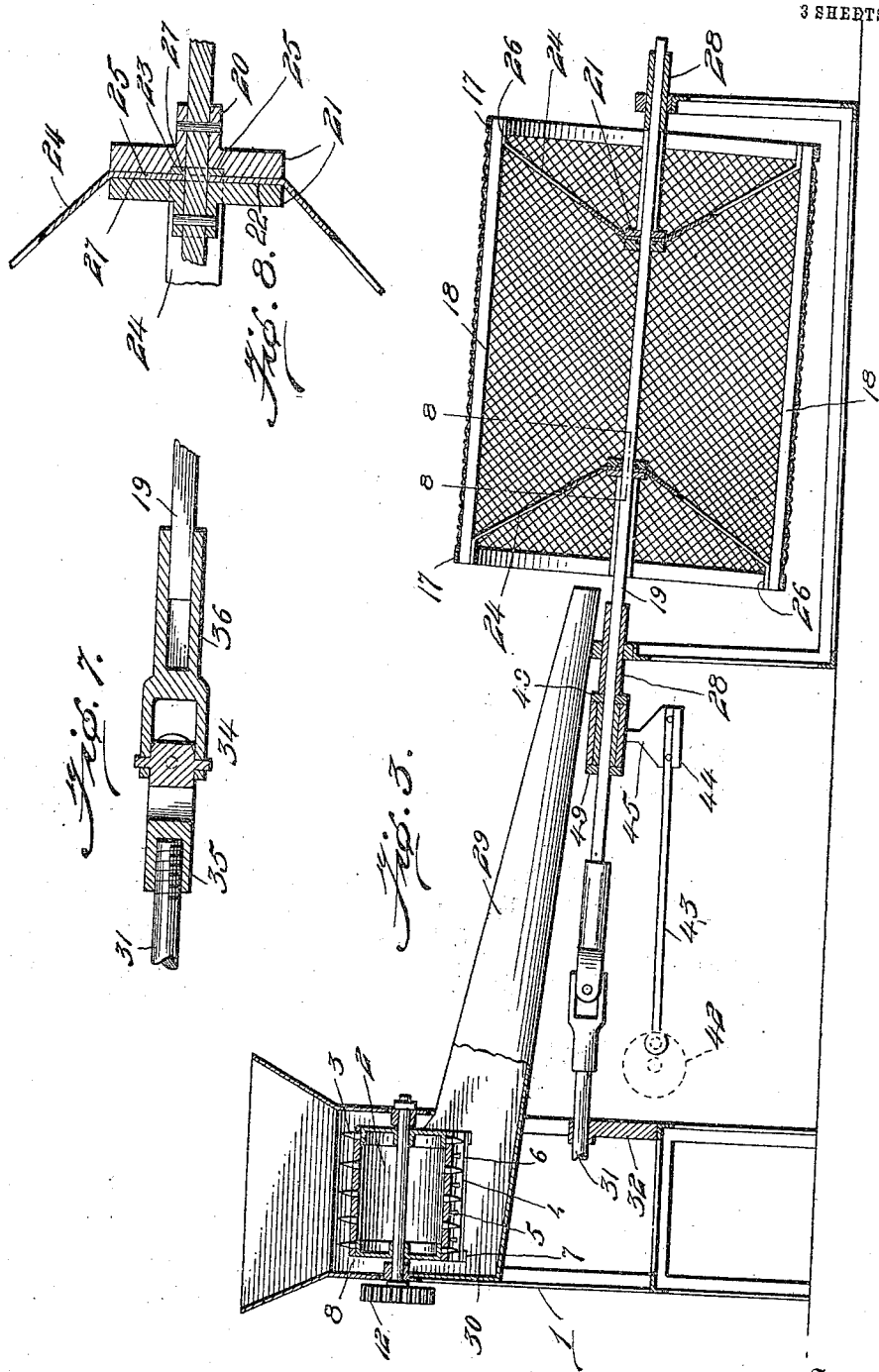

HARVEY NICHOLS, OF JACKSON, MICHIGAN.

SEED-EXTRACTING MACHINE.

960,577.  Specification of Letters Patent.  Patented June 7, 1910.

Application filed December 30, 1909. Serial No. 535,650.

*To all whom it may concern:*

Be it known that I, HARVEY NICHOLS, a citizen of the United States, residing at Jackson, in the county of Jackson and State of Michigan, have invented certain new and useful Improvements in Seed-Extracting Machines; and I do declare the following to be a full, clear, and exact description of the invention, such as will enable others skilled in the art to which it appertains to make and use the same.

This invention relates to improvements in seed extracting machines.

One object of the invention is to provide an improved construction of grinding or shredding mechanism whereby the fruit or vegetables are disintegrated or broken up.

Another object is to provide an improved means whereby the seeds are thoroughly separated from the pulp and skins after being disintegrated by the shredding mechanism.

With the foregoing and other objects in view, the invention consists of certain novel features of construction, combination and arrangement of parts as will be more fully described and particularly pointed out in the appended claims.

In the accompanying drawings, Figure 1 is a side view of a seed extracting machine constructed in accordance with my invention; Fig. 2 is a top plan view of the same; Fig. 3 is a vertical longitudinal section; Fig. 4 is a vertical cross section through the shredding mechanism; Fig. 5 is a similar view through the rotary screen or separating mechanism; Fig. 6 is an enlarged vertical cross section through the screen shaft and the connection of the shaking mechanism therewith on the line 6—6 of Fig. 1; Fig. 7 is a horizontal sectional view through the same parts on the line 7—7 of Fig. 1; Fig. 8 is a horizontal section through the screen shaft on the line 8—8 of Fig. 3 showing the manner of connecting the screen supporting arms with the shaft.

In the embodiment of the invention I provide a shredding mechanism and a separating mechanism by means of which the fruit or vegetables from which the seeds are extracted are thoroughly broken up or reduced to a pulp and the seeds separated therefrom.

My improved shredding mechanism comprises a supporting frame 1 in the upper portion of which is revolubly mounted a cylinder 2, which is preferably of hollow metal construction and has arranged thereon a series of teeth 3, said teeth being preferably arranged spirally around the cylinder. The teeth 3 are preferably provided with threaded shanks which are screwed into threaded openings in the side of the cylinder. The cylinder 2 is adapted to work in a concave 4 which is also provided with a series of teeth 5. The concave 4 preferably consists of a series of longitudinal bars or plates 6 connected together at their opposite ends by curved bars 7. The teeth 5 are screwed into the longitudinal bars or plates 6 and are arranged in longitudinal rows and spaced at suitable distances apart to permit the teeth 3 of the cylinder to pass between the same, thus breaking up and shredding the fruit and vegetables brought between the cylinder and the concave. Over the upper portion of the cylinder is arranged a casing 8 on which is supported a suitable hopper 9 which receives the fruit and vegetables and feeds the latter to the cylinder.

Revolubly mounted in the upper portion of the frame 1 is an operating shaft 10 on one end of which is fixed a large spur gear 11 which is adapted to operatively engage a gear pinion 12 on the adjacent end of the cylinder shaft whereby the cylinder is revolved. On the opposite end of the cylinder shaft is arranged a fly wheel 13. The operating shaft is provided on its outer end with a crank handle 14 or other suitable operating means whereby the shaft 10 is driven.

My improved separating mechanism comprises a supporting frame 15 in which is revolubly mounted a cylindrical screen 16, said screen comprising annular end frames or rings 17, which are connected together at suitable intervals by longitudinal bars 18 and around said frames and bars is arranged a covering or wire netting having a mesh of sufficient size to permit the seeds to pass through but which will retain the pulp and skins of the seeds and vegetables, said pulp and skins being discharged from the cylinder at the lower end of the same. The cylinder 16 is provided with a supporting and operating shaft 19 which is preferably square in cross section and has arranged thereon at suitable positions cylindrical sleeves 20, on the inner ends of which are formed annular heads 21. On the inner side of one of the heads 21 is formed a central transversely disposed groove or channel 22 while in the opposite head is formed a similar groove or channel 23, said channel 23 being arranged at right angles to the channel 22. The heads 21 are adapted to be brought together on the shaft 19 and bolted or otherwise secured, and when thus engaged the grooves or channels 22 and 23 form right angularly disposed passages through the heads.

Adapted to be engaged with the channels or grooves 22 and 23 before the heads are brought together are screen supporting arms, said arms comprising a central groove engaging portion 25 and angularly bent screen engaging portions 24, said portions having on their outer ends lugs 26 which are adapted to be bolted to the annular frames or rings 17 of the screen frame. The central groove engaging portions 25 of the arms have formed therein rectangular passages 27 which coincide with the rectangular passages through the sleeves 20 and heads 21 and are adapted to receive the squared shaft of the screen. The shaft 19 is provided at the opposite ends of the screen with bearing sleeves 28 which are engaged with suitable bearings in the ends of the frame as shown.

The screen is connected with the shredding mechanism by a suitable chute 29 one end of which is connected with a trough 30 arranged below the concave of the shredding mechanism, while the other end of said chute rests on the frame of the screen in position to discharge the shredded fruit or vegetables into the screen. The frames which support the shredding mechanism and the separating mechanism are of such height with respect to each other that the screen will be on a level below the shredding mechanism, the chute being thus disposed at sufficient inclination to permit the shredded fruit and vegetables to readily pass from the shredding mechanism to the screen.

The screen is revolved by means of an operating shaft 31 journaled in suitable bearings 32 in the frame of the shredding mechanism as shown. The shaft 31 is provided on its outer end with a spur gear 33 which is engaged by the gear 11 of the cylinder operating mechanism, whereby the motion of said gear is imparted to the shaft 31 and through the same transmitted to the screen.

The shaft 31 is provided on its outer end with a universal joint 34 whereby the same is operatively connected with the shaft of the screen which is disposed at lower level than the shaft 31. The universal joint 34 is provided on its opposite ends with socket members 35 and 36. The socket member 35 is rigidly secured to the end of the shaft 31 while the end of the squared cylinder shaft 19 has a sliding engagement with the socket member 36 which is provided with a squared recess to receive the end of the shaft.

In order to impart a reciprocating as well as a rotary motion to the screen 16, I provide a suitable reciprocating mechanism comprising a main operating shaft 37 which is revolubly mounted in suitable bearings in the frame 1 and is provided on one end with a spur gear 38, which is engaged by the gear 33 of the screen revolving shaft 31 and has fixedly mounted on its opposite end a beveled gear 39 which is operatively engaged with a similar gear 40 on a right angularly disposed shaft 41 journaled in suitable brackets on the frame 1 as shown. On the opposite end of the shaft 41 is fixed a crank disk 42 to which is eccentrically connected one end of a pitman rod 43, the opposite end of which is secured to a sleeve 44 forming part of a connecting arm 45 which projects upwardly and is provided with a forked or bifurcated upper end, as shown.

On the upper ends of the forked or bifurcated portion of the arm 45 are formed bearings 46. On the shaft 19 is arranged an inner sleeve 47 having a squared passage to fit the shaft and to turn therewith and around the sleeve 47 is arranged an outer sleeve 48 in which the sleeve 47 and shaft 19 are adapted to revolve. The sleeves 47 and 48 are held in operative position on the shaft 19 by collars 49 which are secured to the shaft by any suitable fastening means. On the opposite sides of the outer sleeve 48 are formed trunnions 51 which are adapted to be engaged with the bearings 46 on the upper end of the connecting arm 45, whereby said arm is pivotally connected to the sleeve 48. By means of the connection just described, the screen reciprocating mechanism is connected with the screen shaft 19 without interfering with the rotary movement of the shaft or with the revolving mechanism of the screen. When the shaft 19 is reciprocated by the crank disk 42 and pitman rod 43 through the connection described, the inner end of the shaft 19 will slide back and forth in the squared recess of the socket member 36 of the universal joint connection 34, and said shaft will also reciprocate freely through the bearing sleeves 28 which are revolubly mounted in the bearings on the ends of the screen supporting frame, as shown.

By means of the machine constructed as herein shown and described, it will be readily seen that fruit or vegetables may be shredded or disintegrated and the seeds removed from the pulp and skins in one continuous operation, the seeds being separated from the pulp and skins by the rotary motion of the screen while the pulp and skins are discharged from the outer end of the screen by the reciprocating motion of the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a seed extracting machine, a disintegrating device, an operating mechanism connected therewith, a rotary separating screen, a chute to conduct the material from said disintegrating mechanism to said screen, a power transmitting shaft operatively connected with the operating mechanism for said disintegrating device, a socket arranged on the inner end of said power transmitting shaft, a squared screen supporting shaft having a sliding engagement with said socket, a screen supporting frame, means whereby said screen shaft is revolubly and slidably mounted in said frame, and a screen reciprocating mechanism connected with said screen shaft and with the operating mechanism of said power transmitting shaft, whereby said screen is reciprocated simultaneously with the rotary movement thereof.

2. In a seed extracting machine, a disintegrating device, an operating mechanism therefor, a rotary separating screen, a trough to connect said disintegrating device with said screen, a screen supporting frame, a power transmitting shaft operatively connected with the operating mechanism of said disintegrating device, a square socket on said power transmitting shaft, a squared screen operating shaft having a sliding engagement with said socket, bearing sleeves arranged on said squared screen shaft whereby said shaft is revolubly mounted in said screen supporting frame, a screen reciprocating mechanism comprising suitable gear operating shafts, a crank disk on one of said shafts, a pitman rod connected to said disk, a connecting arm secured to said pitman rod, inner and outer sleeves arranged on said screen shaft, means to hold said sleeves in position, trunnions arranged on said outer sleeve and bearings formed on the upper end of said connecting arm to receive said trunnions whereby said pitman rod is connected with said sleeve and adapted to impart a reciprocating motion to said screen shaft.

In testimony whereof I have hereunto set my hand in presence of two subscribing witnesses.

HARVEY NICHOLS.

Witnesses:
GEO. H. TOWNSEND,
DAVID R. KITCHEN.